United States Patent
Uemura et al.

(10) Patent No.: US 10,690,370 B2
(45) Date of Patent: Jun. 23, 2020

(54) INDOOR EQUIPMENT AND AIR CONDITIONER

(71) Applicant: Mitsubishi Electric Corporation, Tokyo (JP)

(72) Inventors: Keisuke Uemura, Tokyo (JP); Kazunori Hatakeyama, Tokyo (JP); Yosuke Shinomoto, Tokyo (JP); Mitsuo Kashima, Tokyo (JP); Takashi Matsumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 79 days.

(21) Appl. No.: 15/511,415

(22) PCT Filed: Sep. 26, 2014

(86) PCT No.: PCT/JP2014/075748
§ 371 (c)(1),
(2) Date: Mar. 15, 2017

(87) PCT Pub. No.: WO2016/046992
PCT Pub. Date: Mar. 31, 2016

(65) Prior Publication Data
US 2017/0292733 A1 Oct. 12, 2017

(51) Int. Cl.
*H02K 11/21* (2016.01)
*H02P 3/06* (2006.01)
*H02P 6/18* (2016.01)
*F24F 11/74* (2018.01)
*F24F 11/89* (2018.01)
(Continued)

(52) U.S. Cl.
CPC ............ *F24F 11/74* (2018.01); *F24F 1/0033* (2013.01); *F24F 11/76* (2018.01); *F24F 11/89* (2018.01); *H02P 5/74* (2013.01); *H02P 27/08* (2013.01)

(58) Field of Classification Search
CPC ................ H02K 5/20; H02P 6/14; H02P 6/18
See application file for complete search history.

(56) References Cited

U.S. PATENT DOCUMENTS 6,227,961 B1 * 5/2001 Moore ................. F04D 27/004
454/229
9,383,114 B2 7/2016 Takahara et al.
(Continued)

FOREIGN PATENT DOCUMENTS

CN 102734868 A 10/2012
JP H08-066081 A 3/1996
(Continued)

OTHER PUBLICATIONS

International Search Report of the International Searching Authority dated Dec. 9, 2014 for the corresponding International application No. PCT/JP2014/075748 (and English translation).
(Continued)

*Primary Examiner* — Bickey Dhakal
*Assistant Examiner* — Charles S Laughlin
(74) *Attorney, Agent, or Firm* — Posz Law Group, PLC

(57) ABSTRACT

The present invention includes a plurality of fan motors, first and second inverters for individually driving the fan motors, respectively, and one and a common control unit that performs a control arithmetic for each of the fan motors and generates an individual driving signal given to each of the inverters.

5 Claims, 7 Drawing Sheets

(51) Int. Cl.
*F24F 11/76* (2018.01)
*H02P 5/74* (2006.01)
*F24F 1/0033* (2019.01)
*H02P 27/08* (2006.01)

(56) References Cited

U.S. PATENT DOCUMENTS

| | | | |
|---|---|---|---|
| 2009/0160382 A1* | 6/2009 | Hwang | H02M 5/4585 |
| | | | 318/400.26 |
| 2009/0178424 A1* | 7/2009 | Hwang | F24F 1/20 |
| | | | 62/259.1 |
| 2012/0164508 A1 | 6/2012 | Houchin-Miller et al. | |
| 2012/0252346 A1* | 10/2012 | Takahara | F24F 1/0007 |
| | | | 454/338 |
| 2016/0065103 A1* | 3/2016 | Glenn | H02H 9/002 |
| | | | 318/400.21 |

FOREIGN PATENT DOCUMENTS

| | | |
|---|---|---|
| JP | H08-136035 A | 5/1996 |
| JP | H09-250796 A | 9/1997 |
| JP | H09-264557 A | 10/1997 |
| JP | H11-248231 A | 9/1999 |
| JP | H11-337153 A | 12/1999 |
| JP | 2000-249390 A | 9/2000 |
| JP | 2001-153390 A | 6/2001 |
| JP | 2001-286187 A | 10/2001 |
| JP | 2005-176472 A | 6/2005 |
| JP | 2006-149135 A | 6/2006 |
| JP | 2013-176256 A | 9/2013 |
| JP | 2014-087199 A | 5/2014 |

OTHER PUBLICATIONS

Office Action dated Aug. 8, 2017 issued in corresponding JP patent application No. 2016-549891 (and English translation).
Office Action dated Nov. 27, 2018 in the corresponding CN patent application No. 201480082129.X (and English translation).
Office Action dated Jun. 10, 2019 in corresponding CN patent application No. 201480082129.X (and English translation).

* cited by examiner

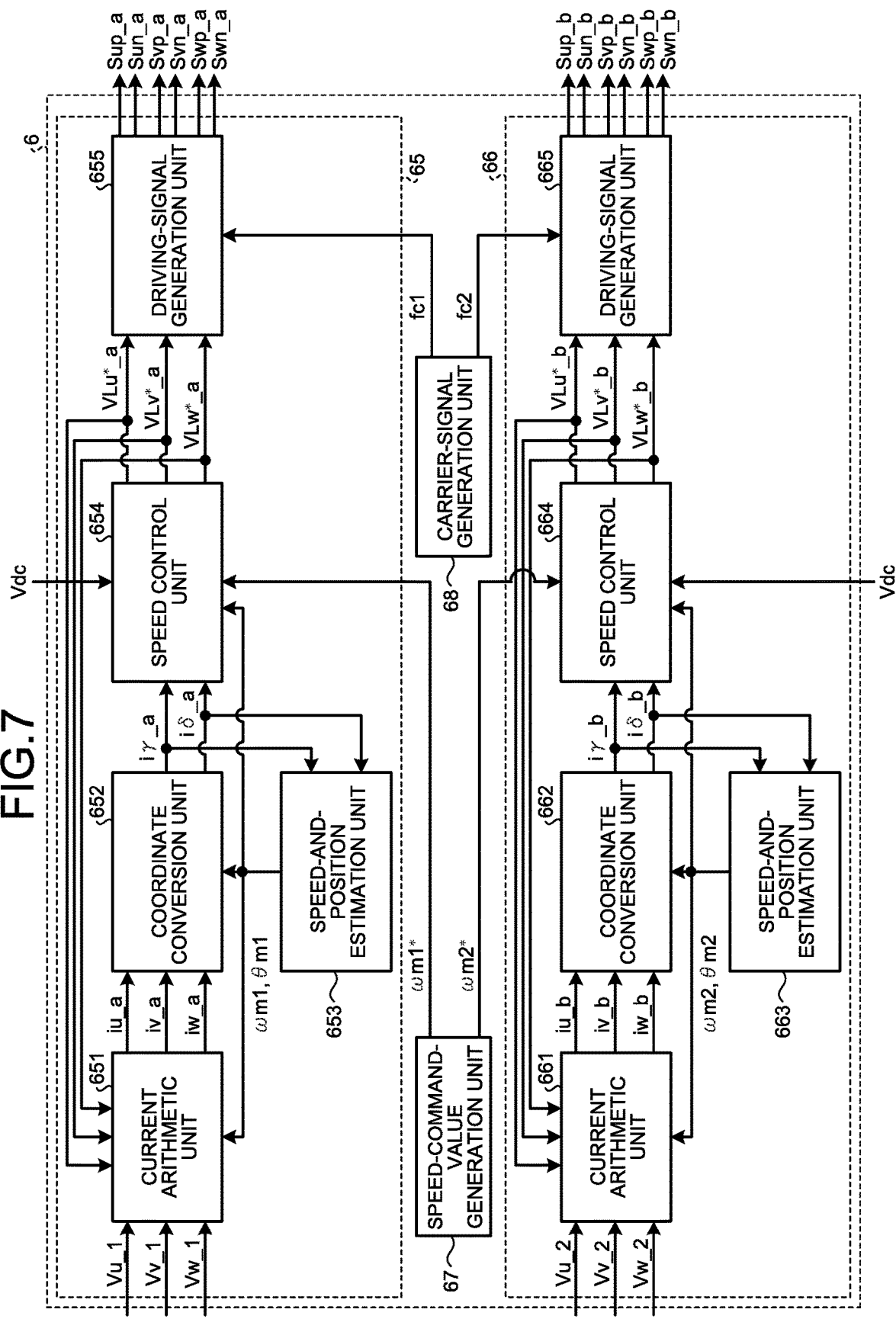

INDOOR EQUIPMENT AND AIR CONDITIONER

CROSS REFERENCE TO RELATED APPLICATION

This application is a U.S. national stage application of International Patent Application No. PCT/JP2014/075748 filed on Sep. 26, 2014, the disclosure of which is incorporated herein by reference.

TECHNICAL FIELD

The present invention relates to an indoor equipment and an air conditioner.

BACKGROUND

As a conventional technique, Patent Literature 1 listed below proposes a method in which three phase inverters according to a PWM modulation method are included, a plurality of fan motors are connected as loads of the respective inverters, a plurality of fan-motor control units as many as the fan motors to control the corresponding fan motors and a system control unit that controls the entire system are provided, and data communication is performed between the system control unit and the fan-motor control units at a time of controlling the fan motors, thereby controlling the fan motors.

PATENT LITERATURE

Japanese Patent Application Laid-open No. 2001-286187

According to the technique described in Patent Literature 1 described above, the data communication needs to be performed between the system control unit and the plurality of fan-motor control units. Therefore, contents of software processing in each of the control units become complicated and a data communication unit for the data communication needs to be provided, resulting in a problem that the size of the device is increased.

Furthermore, the fan motors and a plurality of power converters for driving the fan motors are mounted and thus larger noises than that in an indoor equipment including only one fan motor occur. Particularly, a problem that noises occurring in the power converters interfere with each other and is amplified as a whole is also conceivable. When the control units are provided for the corresponding fan motors, respectively, as in Patent Literature 1 listed above, the control units cannot be synchronized with each other. Accordingly, it is difficult to manage switching of the respective power converters and measures for preventing noise interference are difficult to take.

Even for an indoor equipment, influences of disturbance elements on the controllability need to be considered. In an indoor equipment, influences of disturbance elements (an external wind, for example) on fan motors are smaller than in an outdoor equipment. Therefore, it is considered that a state (hereinafter, "free-run state") in which a fan motor being stopped is driven by a disturbance element in an indoor equipment is less likely to occur. However, when an indoor equipment includes a plurality of fan motors, airflows of the fans interfere with each other and thus the free-run state occurs in some cases.

For example, among a plurality of fan motors, when some of fan motors are driven and the others are stopped, the stopped fan motors are brought to a free-run state due to airflows from the driven fan motors. When the number of rotations in the free-run state is large, it becomes difficult to start the stopped fan motors, resulting in a problem that the controllability of the fan motors is deteriorated. As described above, an indoor equipment having a plurality of fan motors has a problem specific to the indoor equipment. However, Patent Literature 1 neither describes nor suggests a method for handling this problem.

SUMMARY

The present invention has been achieved in view of the above problems, and an object of the present invention is to provide an indoor equipment and an air conditioner that can improve the controllability of fan motors in a free-run state.

To solve the above described problem and achieve the object, an indoor equipment of an air conditioner according to the present invention includes: a plurality of fan motors; a plurality of power converters for individually driving the fan motors, respectively; and one and a common control unit that performs a control arithmetic for each of the fan motors and generates an individual driving signal given to each of the power converters.

According to the present invention, in the indoor equipment of the air conditioner, there is obtained an effect where the controllability of fan motors in a free-run state can be improved.

BRIEF DESCRIPTION OF DRAWINGS

FIG. 7 is a diagram illustrating a configuration example of a control unit according to the second embodiment.

DETAILED DESCRIPTION

An air conditioner according to embodiments of the present invention will be described below with reference to the accompanying drawings. The present invention is not limited to the embodiments.

First Embodiment

Figure 1:
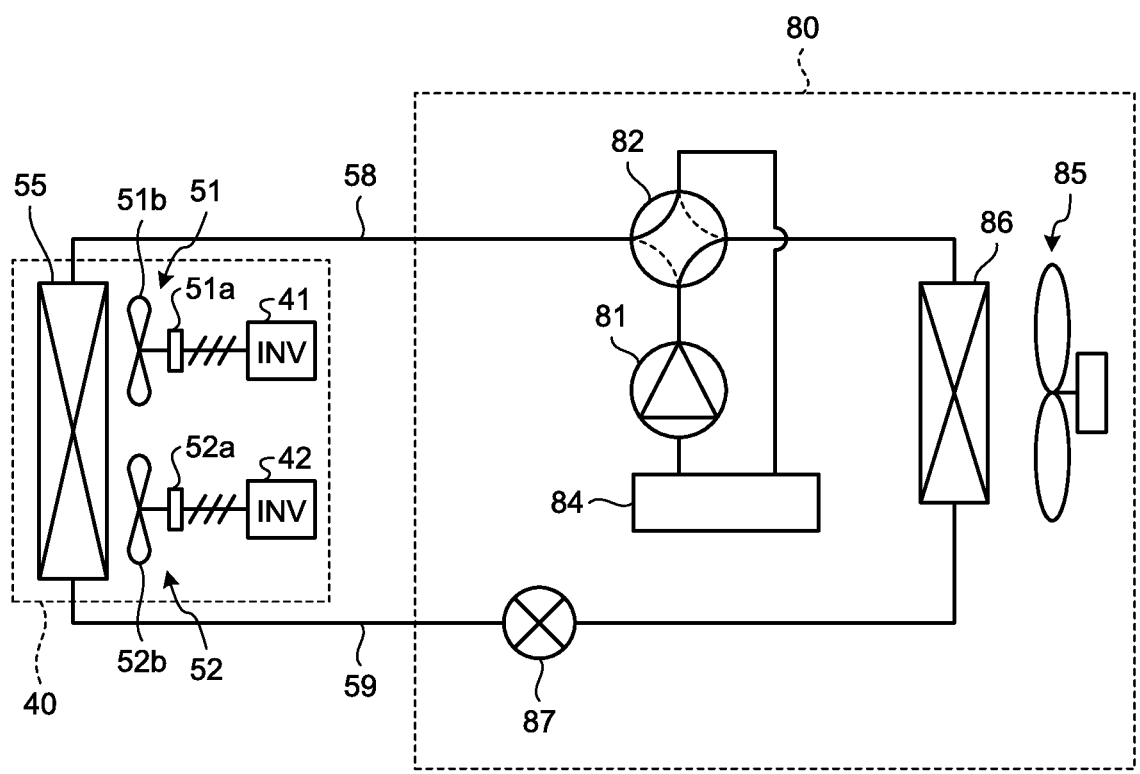
FIG. 1 is a diagram illustrating a configuration example of an air conditioner according to a first embodiment.

FIG. 1 is a diagram illustrating a configuration example of an air conditioner according to a first embodiment. As illustrated in FIG. 1, the air conditioner according to the first embodiment includes: an indoor equipment 40; an outdoor equipment 80; a gas refrigerant pipe 58 and a liquid refrigerant pipe 59 that connect the indoor equipment 40 and the outdoor equipment 80; and a throttle device 87.

The outdoor equipment 80 includes a compressor 81 that compresses a refrigerant and discharges the compressed refrigerant. On a discharge side of the compressor 81, a four-way valve 82 serving as a flow-path switching unit that switches flow paths of a refrigerant, an outdoor heat exchanger 86, and the throttle device 87 are connected sequentially with pipes to constitute a part of a refrigerant circuit. On an intake side of the compressor 81, the four-way valve 82 and an accumulator 84 are connected sequentially with pipes. The four-way valve 82 is connected to the gas refrigerant pipe 58. An outdoor equipment fan 85 is provided in vicinity of the outdoor heat exchanger 86.

The outdoor heat exchanger 86 includes a tube-type heat exchanger constituted of, for example, a heat transfer tube and many fins and acts as a condenser during a cooling operation while acting as an evaporator during a heating operation. The outdoor equipment fan 85 is driven by a fan motor (not illustrated) and the number of motor rotations is changed to adjust the volume of air, thereby adjusting the volume of air sent from the outdoor equipment fan 85.

The throttle device 87 includes, for example, an electronic expansion valve; an opening degree thereof is set to adjust the refrigerant flow rate; and functions as a depressurization valve and an expansion valve to depressurize a refrigerant to be expanded. In FIG. 1, a case where the throttle device 87 is provided in the outdoor equipment 80 is illustrated. However, the throttle device 87 may be provided in the indoor equipment 40.

The indoor equipment 40 includes: an indoor heat exchanger 55; first and second indoor equipment fans (51 and 52); and first and second inverters (41 and 42) that are power converters for individually driving the first and second indoor equipment fans (51 and 52), respectively. The first indoor equipment fan 51 includes a first fan motor 51*a* that is driven by the first inverter 41, and a first blade 51*b* that is rotated by the first fan motor 51*a*. The second indoor equipment fan 52 has an identical configuration and includes a second fan motor 52*a* that is driven by the second inverter 42, and a second blade 52*b* that is rotated by the second fan motor 52*a*. A permanent-magnet synchronous motor having a high induced voltage constant and being highly efficient is suitable for the first and second fan motors (51*a* and 52*a*).

The indoor heat exchanger 55 is connected between the gas refrigerant pipe 58 and the liquid refrigerant pipe 59 and constitutes a refrigerant circuit of the air conditioner along with the refrigerant circuit of the outdoor equipment 80. The indoor heat exchanger 55 includes a tube-type heat exchanger constituted of, for example, a heat transfer tube and many fins, and acts as an evaporator during a cooling operation while acting as a condenser during a heating operation.

The first and second indoor equipment fans (51 and 52) send air with which heat has been exchanged by the indoor heat exchanger 55 to an air-conditioning target space in a room. The first and second fan motors (51*a* and 52*a*) individually drive the first and second blades (51*b* and 52*b*) of the first and second indoor equipment fans (51 and 52). The first and second inverters (41 and 42) individually drive the first and second fan motors (51*a* and 52*a*) and changes the numbers of motor rotations to adjust the volumes of air sent from the first and second indoor equipment fans (51 and 52), respectively.

While the configuration including the two indoor equipment fans and the two inverters is illustrated in FIG. 1, the numbers are not limited to two, and a configuration including three or more indoor equipment fans and three or more inverters corresponding to the indoor equipment fans is also a part of the gist of the present invention.

Figure 2:
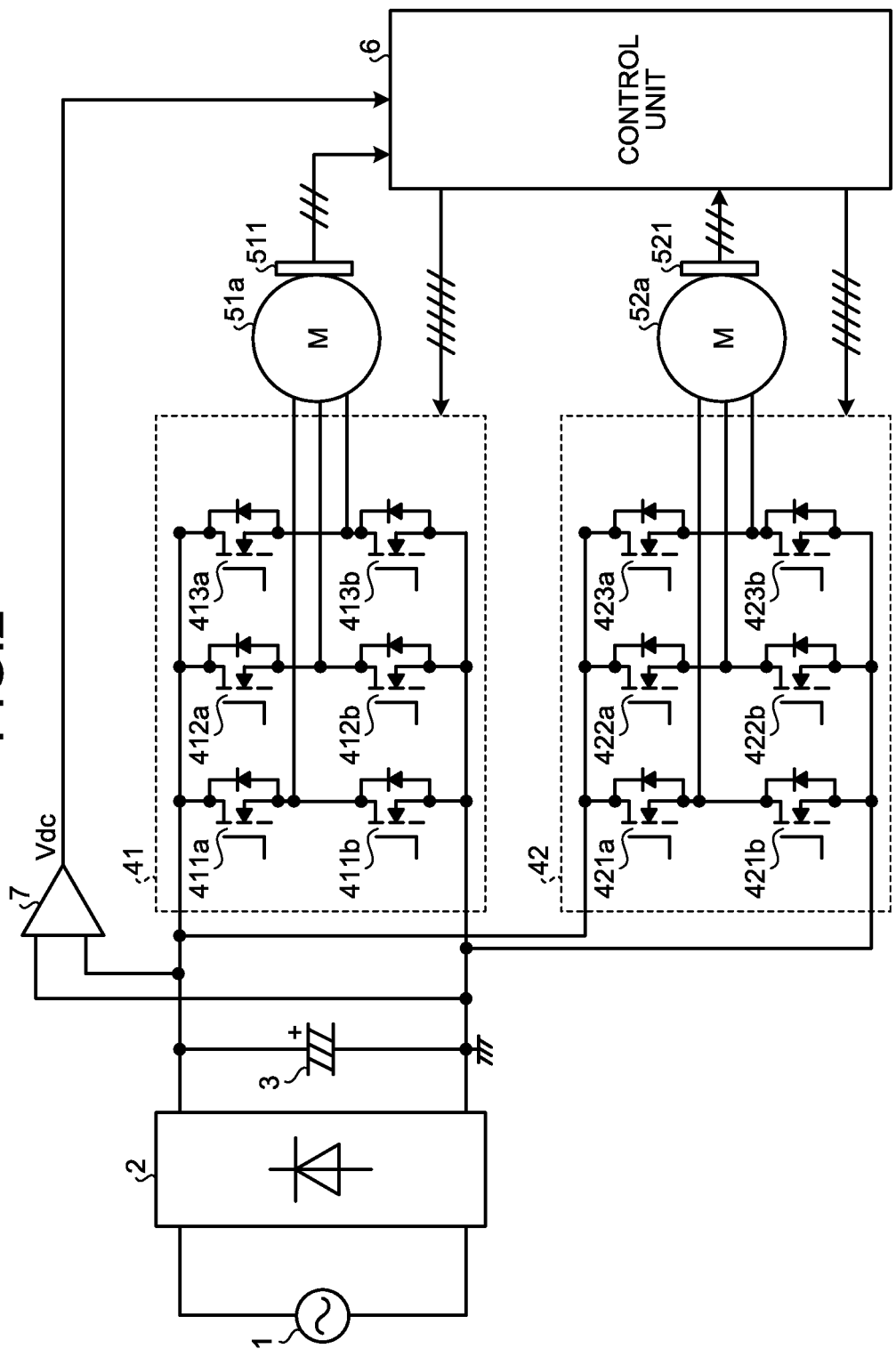
FIG. 2 is a diagram illustrating a configuration example of a power conversion device included in an indoor equipment of the first embodiment and peripheral circuits of the power conversion device.

FIG. 2 is a diagram illustrating a configuration example of a power conversion device included in the indoor equipment of the first embodiment and peripheral circuits of the power conversion device.

As illustrated in FIG. 2, the first inverter 41 and the second inverter 42 are connected in parallel on an output side of a smoothing unit 3, and DC power having been rectified by a rectifier 2 and smoothed by the smoothing unit 3 is supplied thereto. AC power from an AC power supply 1 is supplied to the rectifier 2.

The DC power smoothed by the smoothing unit 3 is converted into three-phase AC power by the first inverter 41 and the second inverter 42, and the three-phase AC power from the respective inverters is supplied to the first fan motor 51*a* and the second fan motor 52*a*, respectively.

The first inverter 41 is configured to include a U-phase upper-arm switching element 411*a*, a V-phase upper-arm switching element 412*a*, a W-phase upper-arm switching element 413*a*, a U-phase lower-arm switching element 411*b*, a V-phase lower-arm switching element 412*b*, and a W-phase lower-arm switching element 413*b* as main constituent elements for supplying the three-phase AC power to the first fan motor 51*a*. The U-phase upper-arm switching element 411*a* and the U-phase lower-arm switching element 411*b* are connected in series to constitute one arm. The same is true for other switching elements. That is, the first inverter 41 is constituted of three arms including a U-phase arm, a V-phase arm, and a W-phase arm. Hereinafter, when a U-phase upper-arm switching element, a V-phase upper-arm switching element, and a W-phase upper-arm switching element are to be collectively referred to, they are referred to as "respective-phase upper-arm switching elements". When a U-phase lower-arm switching element, a V-phase lower-arm switching element, and a W-phase lower-arm switching element are to be collectively referred to, they are referred to as "respective-phase lower-arm switching elements".

The same is true for the second inverter 42. That is, the second inverter 42 is configured to include a U-phase upper-arm switching element 421*a*, a V-phase upper-arm switching element 422*a*, a W-phase upper-arm switching element 423*a*, a U-phase lower-arm switching element 421*b*, a V-phase lower-arm switching element 422*b*, and a W-phase lower-arm switching element 423*b* as main constituent elements for supplying the three-phase AC power to the second fan motor 52*a*. The U-phase upper-arm switching element 421*a* and the U-phase lower-arm switching element 421*b* are connected in series to constitute one arm. The same is true for other switching elements. The second inverter 42 is constituted of three arms including a U-phase arm, a V-phase arm, and a W-phase arm.

The first fan motor 51*a* includes a first rotor-rotational-position detection unit 511 that outputs first position signals Hu1, Hv1, and Hw1 corresponding to a rotational position of a rotor. Similarly, the second fan motor 52*a* includes a second rotor-rotational-position detection unit 521 that outputs second position signals Hu2, Hv2, and Hw2 corresponding to a rotational position of a rotor.

A control unit 6 is a control unit that includes, for example, an arithmetic unit such as a microcomputer or a central processing unit (CPU) and that converts an input analog electrical signal into a digital value to perform an arithmetic and a control operation according to control applications of the first fan motor 51*a* and the second fan motor 52*a*. The first position signals Hu1, Hv1, and Hw1 are input to the control unit 6, and the control unit 6 performs a control arithmetic for the first fan motor 51*a* to output a driving signal to the first inverter 41. Similarly, the second position signals Hu2, Hv2, and Hw2 are input to the control unit 6, and the control unit 6 performs a control arithmetic for the second fan motor 52a to output a driving signal to the second inverter 42.

A bus-bar-voltage detection unit 7 detects an input bus-bar voltage Vdc of the first inverter 41 and the second inverter 42 and outputs a detection value of the input bus-bar voltage Vdc to the control unit 6.

Figure 3:
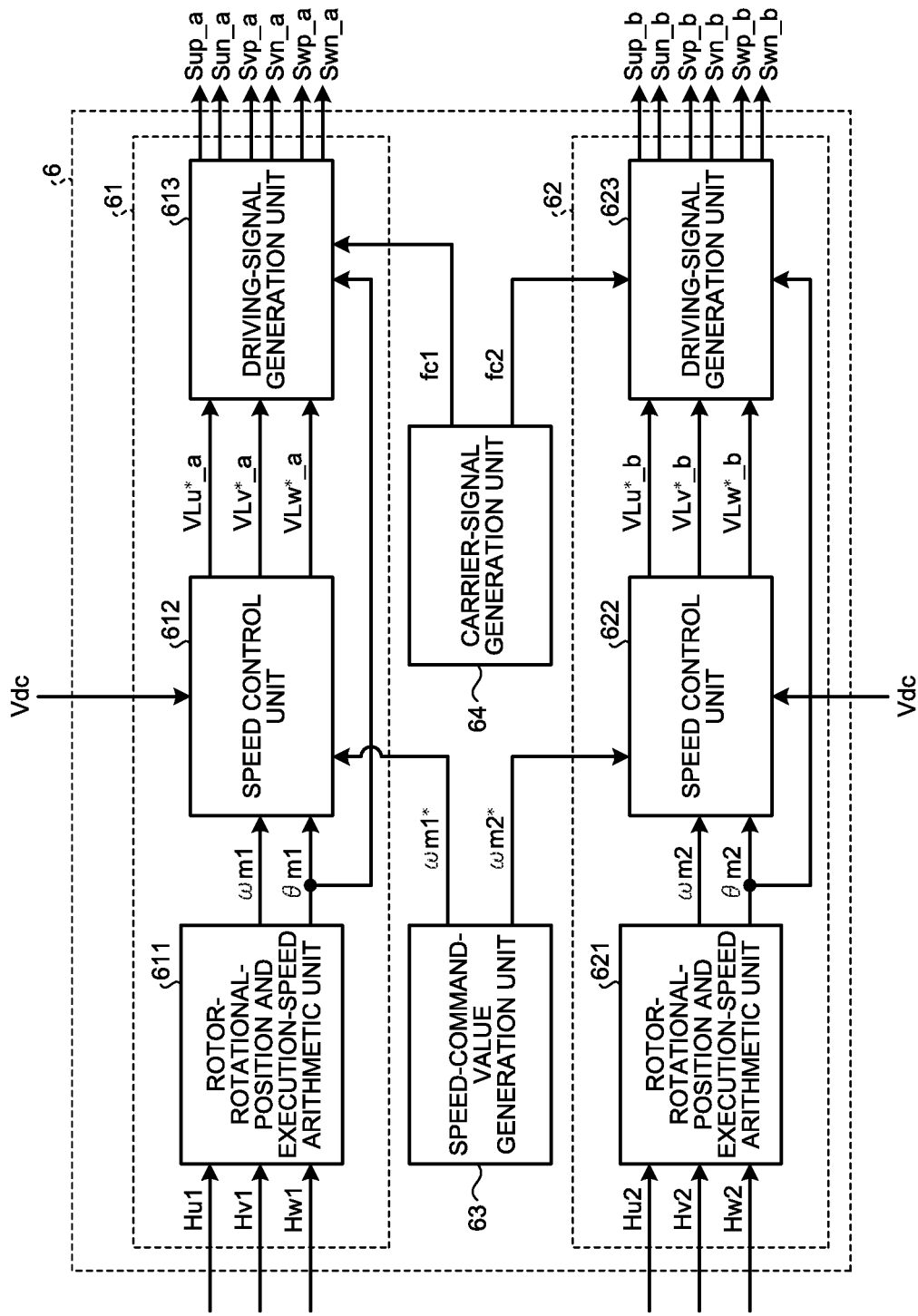
FIG. 3 is a diagram illustrating a configuration example of a control unit according to the first embodiment.

FIG. 3 is a diagram illustrating a configuration example of the control unit 6 according to the first embodiment. The control unit 6 according to the first embodiment is configured to include: a control-arithmetic unit 61 for controlling the first fan motor 51a; a control-arithmetic unit 62 for controlling the second fan motor 52a; a speed-command-value generation unit 63 that generates a speed command value $\omega m1^*$ for the first fan motor 51a and a speed command value $\omega m2^*$ for the second fan motor 52a; and a carrier-signal generation unit 64 that generates a carrier signal fc1 for generating a driving signal to drive the switching elements of the first inverter 41 and a carrier signal fc2 for generating a driving signal to drive the switching elements of the second inverter 42, as illustrated in FIG. 3.

The control-arithmetic unit 61 for the first fan motor 51a includes a rotor-rotational-position and execution-speed arithmetic unit 611, a speed control unit 612, and a driving-signal generation unit 613. The rotor-rotational-position and execution-speed arithmetic unit 611 calculates an execution rotational number $\omega m1$ and a rotor rotational position $\theta m1$ of the first fan motor 51a based on the first position signals Hu1, Hv1, and Hw1. The speed control unit 612 calculates first inverter-output-voltage command values $VLu^*\_a$, $VLv^*\_a$, and $VLw^*\_a$, based on the execution rotational number $\omega m1s$, the speed command value $\omega m1^*$, and the input bus-bar voltage Vdc. The driving-signal generation unit 613 outputs driving signals Sup_a, Sun_a, Svp_a, Svn_a, Swp_a, and Swn_a to the first inverter 41 based on the first inverter-output-voltage command values $VLu^*\_a$, $VLv^*\_a$, and $VLw^*\_a$, the rotor rotational position $\theta m1$, and the carrier signal fc1.

Similarly, the control-arithmetic unit 62 for the second fan motor 52a includes a rotor-rotational-position and execution-speed arithmetic unit 621, a speed control unit 622, and a driving-signal generation unit 623. The rotor-rotational-position and execution-speed arithmetic unit 621 calculates an execution rotational number $\omega m2$ and a rotor rotational position $\theta m2$ of the second fan motor 52a based on the second position signals Hu2, Hv2, and Hw2. The speed control unit 622 calculates second inverter-output-voltage command values $VLu^*\_b$, $VLv^*\_b$, and $VLw^*\_b$, based on the execution rotational number $\omega m2$, the speed command value $\omega m2^*$, and the input bus-bar voltage Vdc. The driving-signal generation unit 623 outputs driving signals Sup_b, Sun_b, Svp_b, Svn_b, Swp_b, and Swn_b, to the second inverter 42 based on the second inverter-output-voltage command values $VLu^*\_b$, $VLv^*\_b$, and $VLw^*\_b$, the rotor rotational position $\theta m2$, and the carrier signal fc2.

With the configuration and the control method described above, in an indoor equipment including a plurality of indoor equipment fans, it becomes possible to control the indoor equipment fans individually and independently using a plurality of fan motors and a plurality of inverters.

Furthermore, the fan motors and the inverters are controlled by one arithmetic unit, that is, by a common arithmetic unit included in the control unit, whereby various effects described below are achieved.

First, there is an effect where noises in the indoor equipment can be easily reduced. Generally, for an indoor equipment, a market demand against noises is high and inverters are often driven at a carrier frequency (equal to or higher than 16 kHz, for example) which is equal to or higher than an audible zone. Accordingly, noises occurring in a single inverter become large. Furthermore, when a plurality of inverters are provided in one indoor equipment, noises occurring in the inverters may interfere with each other to be amplified as a whole. When the fan motors are controlled by a common arithmetic unit, carrier signals for driving the inverters are included together in the arithmetic unit and switching of the inverters can be managed synchronously. Therefore, an algorithm for cancelling the noises occurring in the inverters (changing a phase difference between carrier signals or correcting voltage command values for the inverters, for example) can be easily implemented.

Second, there is an effect where quietness of the indoor equipment is improved thanks to a suppression of an interference sound. Even when speed control (PID control, for example) on a fan motor is executed by a speed controller in an arithmetic unit, a slight pulsation occurs in the speed of the fan motor. When a plurality of fan motors are placed, the speed pulsations interfere with each other, resulting in an interference sound. When the fan motors are controlled by a common arithmetic unit, speed-control state quantities of the respective fan motors can be always known and compared. Therefore, an algorithm for improving the quietness (cancelling an interference sound by controlling a phase difference in the speed pulsations of the respective fan motors, for example) can be easily implemented.

Third, there is an effect where the quietness of the indoor equipment is improved thanks to a suppression of influences of a bus-bar voltage pulsation. When an AC voltage is converted into a DC voltage by a converter, the DC voltage includes pulsation components proportional to a power supply frequency (for example, pulsation components twice as high as an AC voltage frequency in a case of a single-phase AC voltage). Because the arithmetic unit calculates modulation rates by dividing the respective-phase output-voltage command values of the inverters by the bus-bar-voltage detection values of the inverters to generate driving signals for the inverter switching elements, the pulsation components of the bus-bar voltage influence the modulation rates and generation of the driving signals for the inverter switching elements, so that the speeds of the respective fan motors also pulsate. This speed pulsation influences the interference sound described above. By controlling the fan motors with a common arithmetic unit, the modulation rates can be calculated using a common bus-bar-voltage detection value. Therefore, an algorithm for suppressing influences of the bus-bar voltage pulsation (correcting the respective inverter-output-voltage command values, for example) can be easily implemented.

Fourth, there is an effect where controllability is improved thanks to management of detection timings of respective detection values. As long as the fan motors are driven, detection values (the rotor position signals in the first embodiment) change with time. Accordingly, if the detection timings of the respective detection values are not managed, the detection values cannot be handled equivalently on a time axis. When the fan motors are controlled by a common arithmetic unit, the detection timings of the detection values can be arbitrarily determined in the common arithmetic unit and thus management of the detection timings becomes easy. Even when there is a temporal difference in the detection timings, the detection timings can be known and compared in the common arithmetic unit. Therefore, the temporal difference can be calculated to correct the detection values based on the temporal difference. From above, the detection values can be handled equivalently on the time axis thanks to management of the detection timings of the respective detection values and correction of the detection values, so that the three effects described above can be implemented more easily.

Fifth, there is an effect where quality and reliability as a product are improved. Because the position detection signals of the respective fan motors are detected by the arithmetic unit in the first embodiment, a connector is often used to connect position detection units for the fan motors to a substrate on which the arithmetic unit is mounted. Similarly, connectors are often used to connect the first fan motor to the first inverter and to connect the second fan motor to the second inverter. A case in which the first fan motor and the second fan motor are erroneously connected when the connectors are connected in indoor equipment manufacturing is conceivable. When the fan motors are controlled by the common arithmetic unit, the position detection signals of the respective fan motors can be known and compared in the common arithmetic unit. Therefore, when an algorithm for detecting erroneous connection wiring is added, the erroneous connection wiring can be found at a test step during manufacturing. Furthermore, the connection can be easily corrected and thus an improvement in the quality and an improvement in the reliability as a product can be achieved.

As described above, the five effects described above can be achieved by controlling the fan motors with the common arithmetic unit.

A method of starting a fan motor in the free-run state will be described next.

Figure 4:
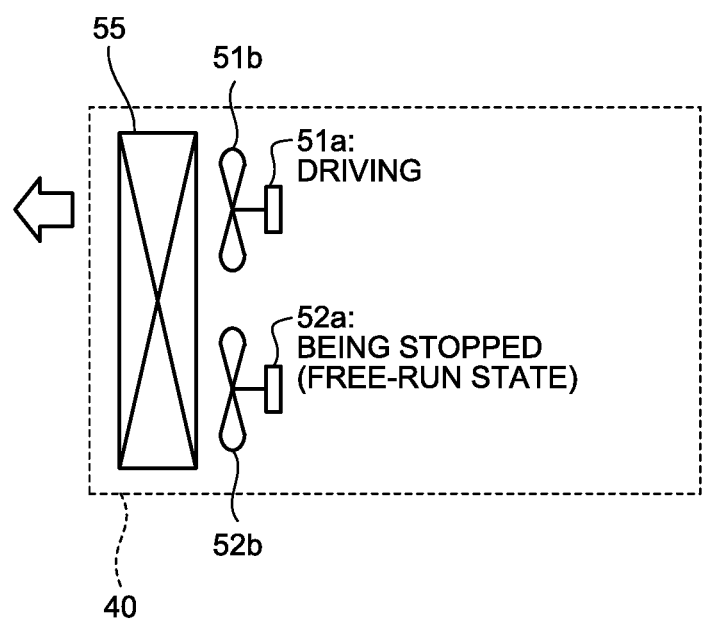
FIG. 4 is a diagram illustrating a state in which one fan motor is driven and another fan motor is stopped.

As illustrated in FIG. 4, a case where the first fan motor 51a is driven and the second fan motor 52a is stopped is assumed. In this case, an airflow passes from an inlet (not illustrated) of the indoor equipment 40 to an outlet (not illustrate) of the indoor equipment 40 through the first blade 51b rotated by the first fan motor 51a. At that time, the second blade 52b is subjected to the airflow and is brought to a free-run state. The number of free-run rotations at that time is proportional to the execution rotational number of the first fan motor 51a.

In this case, at the time of starting the second fan motor 52a in the free-run state, there is a problem that the starting is difficult when the number of free-run rotations is high. Therefore, measures such as starting the second fan motor 52a after reducing the speed command value ωm1* of the first fan motor 51a are required, which deteriorates the controllability of the indoor equipment.

Therefore, in the first embodiment, the respective-phase lower-arm switching elements 421b, 422b, and 423b of the second inverter 42 are controlled to be an ON state. At that time, brake torque is generated from the second fan motor 52a and thus the number of free-run rotations of the second fan motor 52a can be reduced without reducing the number of rotations of the first fan motor 51a.

The brake torque is obtained based on a voltage equation of a three-phase brushless DC motor. Generally, the voltage equation of the three-phase brushless DC motor and the torque are represented by the following formulas (1) and (2).

[Formula 1]

$$\begin{bmatrix} v_d \\ v_q \end{bmatrix} = \begin{bmatrix} R + sL_d & -\omega L_q \\ \omega L_d & R + sL_q \end{bmatrix} \begin{bmatrix} i_d \\ i_q \end{bmatrix} + \omega \begin{bmatrix} 0 \\ \phi_f \end{bmatrix} \quad (1)$$

[Formula 2]

$$\tau_m = P\{\phi_f i_q + (L_d - L_q) i_d i_q\} \quad (2)$$

The signs in the formulas (1) and (2) described above denote as follows.
$v_d$, $v_q$: d, q-axis motor application voltage
$i_d$, $i_q$: d, q-axis motor current
$\tau_m$: motor output torque
$L_d$, $L_q$: d, q-axis motor inductance
R: motor phase resistance
ω: angular velocity
$\phi_f$: motor induced voltage constant
P: number of pole pairs
s: Laplace operator In the formula (1), ω is the number of free-run rotations and is assumed as a fixed value. Because the lower-arm switching elements of an inverter are turned ON, the d-axis motor application voltage $v_d$ and the q-axis motor application voltage $v_q$ become zero. When only a steady state is considered, a derivative term can be ignored and thus the formula (1) is rewritten to the following formula (3).

[Formula 3]

$$\begin{bmatrix} 0 \\ 0 \end{bmatrix} = \begin{bmatrix} R & -\omega L_q \\ \omega L_d & R \end{bmatrix} \begin{bmatrix} i_d \\ i_q \end{bmatrix} + \omega \begin{bmatrix} 0 \\ \phi_f \end{bmatrix} \quad (3)$$

When the formula (3) is solved with respect to the d-axis motor current $i_d$ and the q-axis motor current the following formulas (4) and (5) are obtained.

[Formula 4]

$$i_d = \frac{\omega^2 L_q \phi_f}{L_d L_q \omega^2 + R^2} \quad (4)$$

[Formula 5]

$$i_q = \frac{\omega R \phi_f}{L_d L_q \omega^2 + R^2} \quad (5)$$

When the formulas (4) and (5) are substituted into the formula (2), the brake torque of a motor can be represented by the following formula (6).

[Formula 6]

$$\tau_m = \frac{P \omega R \phi_f^2}{(L_d L_q \omega^2 + R^2)^2} (2 L_d L_q \omega^2 + R^2 - \omega^2 L_q^2) \quad (6)$$

Therefore, when the second fan motor 52a is in a free-run state, the brake torque represented by the formula (6) is output from the second fan motor 52a by turning ON the lower-arm switching elements 421b, 422b, and 423b of the second inverter 42, and accordingly the number of free-run rotations of the second fan motor 52a can be reduced.

Figure 5:
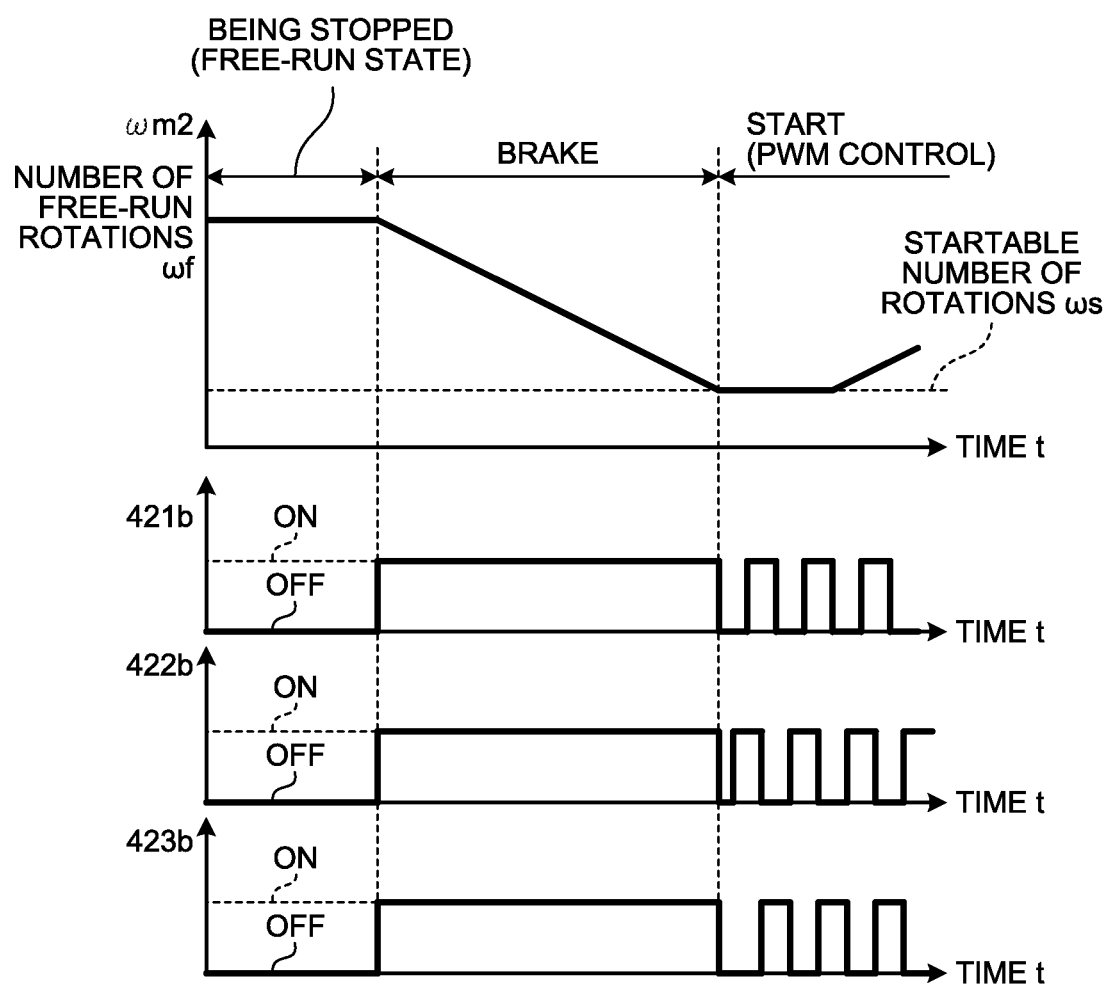
FIG. 5 illustrates a control flow at the time of starting from a free-run state.

FIG. 5 illustrates a control flow at the time of starting from a free-run state. A case where the execution rotational number ωm2 of the second fan motor 52a is at a stop in a free-run state (a free-run rotational number ωf) is assumed. When the free-run rotational number ωf is larger than a number of rotations being able to be started ωs, all the lower-arm switching elements 421b, 422b, and 423b of the second inverter 42 are once turned ON. This causes the brake torque represented by the formula (6) to be output from the motor and the execution rotational number ωm2 of the second fan motor 52a is reduced. This state is kept until the execution rotational number ωm2 of the second fan motor 52a becomes smaller than the number of rotations being able to be started cos. From a stage where the execution rotational number ωm2 of the second fan motor 52a has become smaller than the number of rotations being able to be started ωs of rotations, processing of starting the second fan motor 52a is started.

FIG. 5 illustrates a case where the lower-arm switching elements 421b, 422b, and 423b of the second inverter 42 are brought to the ON state. However, in this case, there is a possibility that an excessive current flows as an inrush current and a rotor magnet of the fan motor is demagnetized. Therefore, duty ratios of the lower-arm switching elements 421b, 422b, and 423b of the second inverter 42 can be gradually increased to suppress the inrush current. At that time, it suffices to turn ON, for example, any one of the lower-arm switching elements 421b, 422b, and 423b of the second inverter 42 or any two of the lower-arm switching elements and thereafter turn ON the remaining lower-arm switching element(s), without turning ON all the lower-arm switching elements at the same time.

While the lower-arm switching elements 421b, 422b, and 423b of the second inverter 42 are brought to the ON state in this case, control to bring the upper-arm switching elements 421a, 422a, and 423a of the second inverter 42 to the ON state may be alternatively executed.

As described above, according to the control method of the first embodiment, when the number of free-run rotations is high at the time of starting from a free-run state, the processing of turning ON the lower-arm switching elements of an inverter to cause the brake torque to be output from the fan motor is interposed, so that an effect where starting from the free-run state can be easily performed is achieved. By using this method, the starting can be performed without changing the control state of the fan motor being driven and thus an effect where the controllability of a unit is not lost is also achieved.

Second Embodiment

Figure 6:
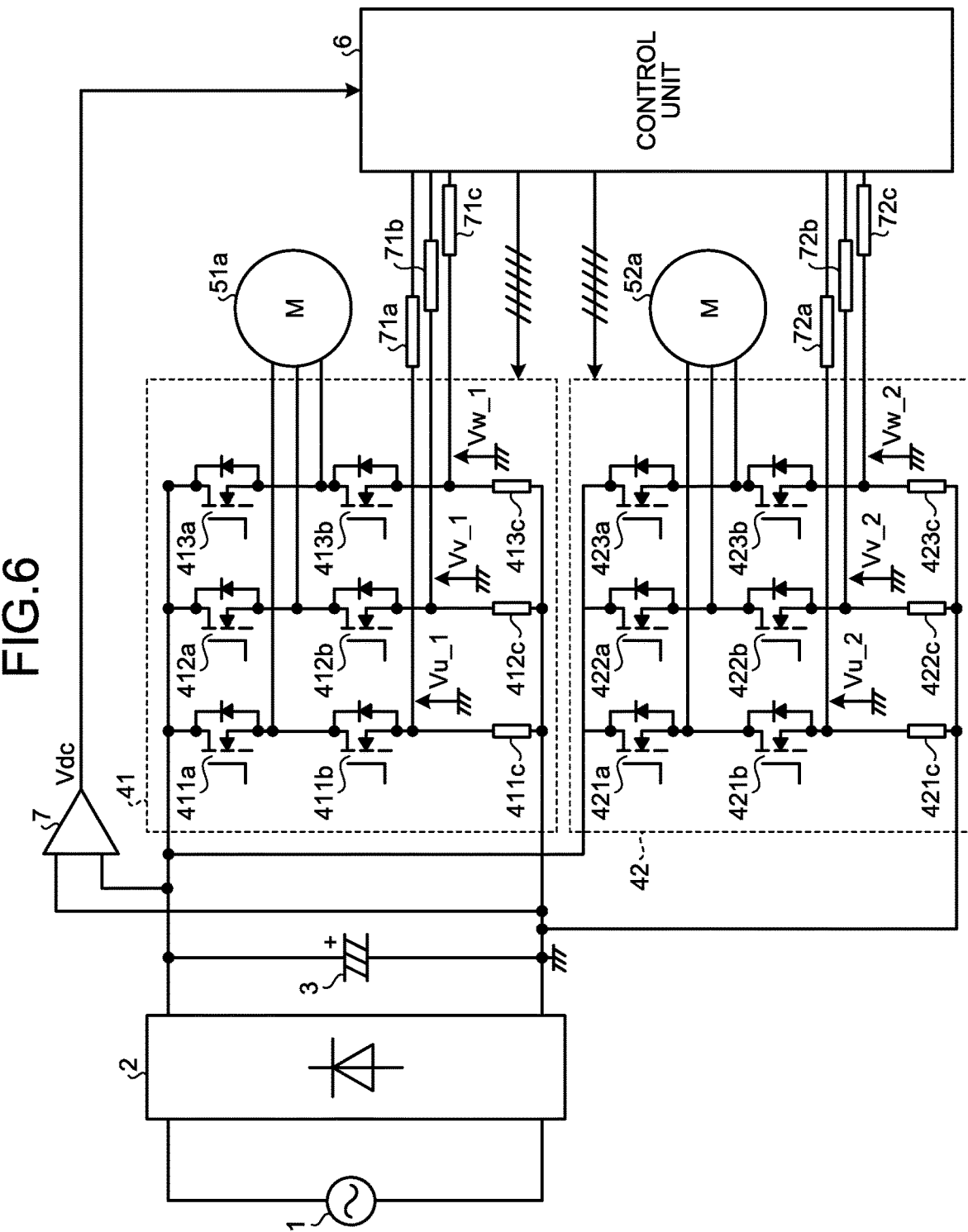
FIG. 6 is a diagram illustrating a configuration example of a power conversion device provided in an indoor equipment according to a second embodiment and peripheral circuits of the power conversion device.

FIG. 6 is a diagram illustrating a configuration example of a power conversion device provided in an indoor equipment according to a second embodiment and peripheral circuits of the power conversion device.

The power conversion device according to the second embodiment is configured to include: a U-phase lower-arm shunt resistance 411c, a V-phase lower-arm shunt resistance 412c, and a W-phase lower-arm shunt resistance 413c for detecting currents flowing in respective phases in the first inverter 41; and a U-phase lower-arm shunt resistance 421c, a V-phase lower-arm shunt resistance 422c, and a W-phase lower-arm shunt resistance 423c for detecting currents flowing in respective phases in the second inverter 42, as illustrated in FIG. 6. Hereinafter, when a U-phase lower-arm shunt resistance, a V-phase lower-arm shunt resistance, and a W-phase lower-arm shunt resistance are collectively referred to, they are referred to as "respective-phase lower-arm shunt resistances".

With the configuration described above, in the power conversion device according to the second embodiment, respective-phase lower-arm-voltage detection units 71a, 71b, 71c, 72a, 72b, and 72c that detect potentials (hereinafter, "respective-phase lower-arm voltages") Vu_1, Vv_1, Vw_1, Vu_2, Vv_2, and Vw_2 of the respective-phase lower-arm shunt resistances 411c, 412c, 413c, 421c, 422c, and 423c are installed instead of the first rotor-rotational-position detection unit 511 and the second rotor-rotational-position detection unit 521 included in the first embodiment. Detection values detected by the respective-phase lower-arm-voltage detection units 71a, 71b, 71c, 72a, 72b, and 72c are input to the control unit 6 as current information of currents flowing in the respective phases. Hereinafter, the respective-phase lower-arm voltages Vu_1, Vv_1, and Vw_1 as the current information of the first inverter 41 are referred to as "first lower-arm voltages Vu_1, Vv_1, and Vw_1", and the respective-phase lower-arm voltages Vu_2, Vv_2, and Vw_2 as the current information of the second inverter 42 are referred to as "second lower-arm voltages Vu_2, Vv_2, and Vw_2" as necessary.

Constituent elements of the second embodiment other than the elements described above are identical or equivalent to those of the first embodiment illustrated in FIG. 2, and the identical or equivalent constituent elements are denoted by like reference signs and detailed descriptions thereof will be omitted.

The respective-phase lower-arm voltages Vu_1, Vv_1, Vw_1, Vu_2, Vv_2, and Vw_2 are input to the control unit 6. A control arithmetic for the first fan motor 51a is performed to output a driving signal to the first inverter 41 and a control arithmetic for the second fan motor 52a is performed to output a driving signal to the second inverter 42.

FIG. 7 is a diagram illustrating a configuration example of the control unit 6 according to the second embodiment. As illustrated in FIG. 7, the control unit 6 according to the second embodiment is configured to include: a control-arithmetic unit 65 for controlling the first fan motor 51a; a control-arithmetic unit 66 for controlling the second fan motor 52a; a speed-command-value generation unit 67 that generates the speed command value ωm1* of the first fan motor 51a and the speed command value ωm2* of the second fan motor 52a; and a carrier-signal generation unit 68 that generates the carrier signal fc1 for generating a driving signal to drive the switching elements of the first inverter 41 and the carrier signal fc2 for generating a driving signal to drive the switching elements of the second inverter 42.

The control-arithmetic unit 65 of the first fan motor 51a includes a current arithmetic unit 651, a coordinate conversion unit 652, a speed-and-position estimation unit 653, a speed control unit 654, and a driving-signal generation unit 655. The current arithmetic unit 651 calculates motor currents iu_a, iv_a, and iw_a, of the first fan motor 51a based on the first lower-arm voltages Vu_1, Vv_1, and Vw_1. The coordinate conversion unit 652 calculates two-phase rotating-coordinate-system currents iγ_a and iδ_a using the motor currents iu_a, iv_a, and iw_a of the first fan motor 51a. The speed-and-position estimation unit 653 calculates the execution rotational number ωm1 and the rotor rotational position θm1 of the first fan motor 51a based on the two-phase rotating-coordinate-system currents iγ_a and iδ_a. The speed control unit 654 calculates the first inverter-output-voltage command values VLu*_a, VLv*_a, and VLw*_a, based on the two-phase rotating-coordinate-system currents iγ_a and iδ_a, the execution rotational number ωm1, the rotor rotational position θm1, the speed command value ωm1*, and the bus-bar-voltage detection value Vdc. The driving-signal generation unit 655 outputs the driving signals Sup_a, Sun_a, Svp_a, Svn_a, Swp_a, and Swn_a, to the first inverter 41 based on the first inverter-output-voltage command values VLu*_a, VLv*_a, and VLw*_a and the carrier signal fc1.

Similarly, the control-arithmetic unit 66 of the second fan motor 52a includes a current arithmetic unit 661, a coordinate conversion unit 662, a speed-and-position estimation unit 663, a speed control unit 664, and a driving-signal generation unit 665. The current arithmetic unit 661 calculates motor currents iu_b, iv_b, and iw_b, of the second fan motor 52a based on the second lower-arm voltages Vu_2, Vv_2, and Vw_2. The coordinate conversion unit 662 calculates two-phase rotating-coordinate-system currents iγ_b and iδ_b using the motor currents iu_b, iv_b, and iw_b of the second fan motor 52a. The speed-and-position estimation unit 663 calculates the execution rotational number ωm2 and the rotor rotational position θm2 of the second fan motor 52a based on the two-phase rotating-coordinate-system currents iγ_b and iδ_b. The speed control unit 664 calculates the second inverter-output-voltage command values VLu*_b, VLv*_b, and VLw*_b based on the two-phase rotating-coordinate-system currents iγ_b and iδ_b, the execution rotational number ωm2, the rotor rotational position θm2, the speed command value ωm2*, and the bus-bar-voltage detection value Vdc. The driving-signal generation unit 665 outputs the driving signals Sup_b, Sun_b, Svp_b, Svn_b, Swp_b, and Swn_b, to the second inverter 42 based on the second inverter-output-voltage command values VLu*_b, VLv*_b, and VLw*_b, and the carrier signal fc2.

With the configuration and the control method described above, in an indoor equipment including a plurality of indoor equipment fans, the indoor equipment fans can be controlled individually and independently using a plurality of fan motors and a plurality of inverters.

A case where the first fan motor 51a is driven and the second fan motor 52a is stopped is assumed (see FIG. 4) similarly in the first embodiment. In this case, an airflow passes from the inlet (not illustrated) of the indoor equipment 40 to the outlet (not illustrated) of the indoor equipment 40 through the first blade 51b rotated by the first fan motor 51a. At that time, the second blade 52b is subjected to the airflow and is brought to a free-run state. The number of free-run rotations in this case is proportional to the execution rotational number of the first fan motor 51a.

When the second fan motor 52a is started from the free-run state, there is a problem that the starting is difficult when the number of free-run rotations is high. Accordingly, measures such as starting the second fan motor 52a after reducing the speed command value ωm1* of the first fan motor 51a are required, which deteriorates the controllability of the indoor equipment.

Therefore, similarly in the first embodiment, the respective-phase lower-arm switching elements 421b, 422b, and 423b of the second inverter 42 are controlled to be the ON state. At that time, the brake torque is generated from the second fan motor 52a and thus the number of free-run rotations of the second fan motor 52a can be reduced without reducing the number of rotations of the first fan motor 51a.

The brake torque of a motor can be represented by the formula (6) similarly in the first embodiment.

From the above configuration, when the second fan motor 52a is in a free-run state, the brake torque represented by the formula (6) is output from the second fan motor 52a by turning ON the lower-arm switching elements 421b, 422b, and 423b of the second inverter 42. Therefore, the number of free-run rotations can be reduced and starting from the free-run state can be easily achieved.

Furthermore, by using the method described above, the second fan motor 52a can be started without changing the state of the first fan motor 51a. Therefore, there is obtained an effect where the controllability of the indoor equipment is improved.

The configurations described in the first and second embodiments are only examples of the configuration of the present invention, and these configurations can be combined with other publicly known techniques. These configurations can be modified without departing from the scope of the present invention, such as a part of the configurations is omitted or parts thereof are combined with each other.

INDUSTRIAL APPLICABILITY

As described above, the present invention is preferable to be used in an indoor equipment and an air conditioner.

The invention claimed is:

1. An indoor equipment of an air conditioner, comprising:
an indoor heat exchanger;
a plurality of indoor equipment fans, including a first indoor equipment fan and a second indoor equipment fan, wherein the first indoor equipment fan includes a first fan motor and the second indoor equipment fan includes a second fan motor, and wherein the first indoor equipment fan and the second indoor equipment fan send air with which heat has been exchanged by the indoor heat exchanger to an air-conditioning target space in a room;
a plurality of power converters, including a first inverter and a second inverter, for individually driving the first fan motor and the second fan motor, respectively, wherein the first inverter is configured to drive the first motor to change numbers of rotations of the first motor to adjust volumes of air sent from the first equipment fan, and the second inverter is configured to drive the second motor to change numbers of rotations of the second motor to adjust volumes of air sent from the second equipment fan, wherein each of the first inverter and the second inverter includes upper-arm switching elements and lower-arm switching elements; and
a controller configured to control each of the first fan motor and the second fan motor and to generate an individual driving signal given to each of the first inverter and the second inverter, wherein
the controller comprises:
a first control-arithmetic circuitry configured to control the first fan motor;
a second control-arithmetic circuitry configured to control the second fan motor;
a speed-command-value generation circuitry configured to generate a first speed command value for the first fan motor and a second speed command value for the second fan motor; and
a carrier-signal generation circuitry configured to generate a carrier signal for generating a first driving signal to drive the switching elements of the first inverter and a carrier signal for generating a driving signal to drive the switching elements of the second inverter,
each of the first control-arithmetic circuitry and the second control-arithmetic circuitry includes a rotor-rotational-position and execution-speed arithmetic circuitry, a speed control circuitry, and a driving-signal generation circuitry, and when at least one of the first fan motor and the second fan motor is in a driving state and at least one of the fan motors other than the fan motor in the driving state is in a free-run state caused by interference of airflows in the air-conditioning target space, the controller drives at least one of switching elements of the first inverter and the second inverter connected to the fan motor in the free-run state to apply a braking force to the fan motor in the free-run state and thereafter starts the fan motor.

2. The indoor equipment according to claim 1, wherein switching elements that apply the braking force to the fan motor in the free-run state at a time of starting at least one of the first fan motor and the second fan motor are the lower-arm switching elements in the power converter.

3. The indoor equipment according to claim 1, wherein switching elements that apply the braking force to the fan motor in the free-run state at a time of starting at least one of the first fan motor and the second fan motor are the upper-arm switching elements in the power converter.

4. The indoor equipment according to according to claim 1, wherein the first fan motor and the second fan motor are permanent-magnet synchronous motors.

5. An air conditioner comprising the indoor equipment according to claim 1.

* * * * *